United States Patent
Schmitt et al.

(10) Patent No.: US 8,431,229 B2
(45) Date of Patent: Apr. 30, 2013

(54) COATING FORMULATION WITH ENHANCED METAL ADHESION

(75) Inventors: Guenter Schmitt, Darmstadt (DE); Peter Neugebauer, Limburg (DE); Sybille Scholl, Rodenbach (DE); Heike Heeb, Nauheim (DE); Peter Reinhard, Dreieich-Dreieichenhain (DE); Gilbert Kuehl, Hanau (DE)

(73) Assignee: Evonik Röhm GmbH, Darmstadt (DE)

( * ) Notice: Subject to any disclaimer, the term of this patent is extended or adjusted under 35 U.S.C. 154(b) by 123 days.

(21) Appl. No.: 12/668,672

(22) PCT Filed: Jun. 25, 2008

(86) PCT No.: PCT/EP2008/058048
§ 371 (c)(1),
(2), (4) Date: Jan. 12, 2010

(87) PCT Pub. No.: WO2009/013090
PCT Pub. Date: Jan. 29, 2009

(65) Prior Publication Data
US 2010/0204396 A1    Aug. 12, 2010

(30) Foreign Application Priority Data
Jul. 20, 2007  (DE) .......................... 10 2007 034 456

(51) Int. Cl.
*B32B 15/08*    (2006.01)

(52) U.S. Cl.
USPC .......................................... 428/463; 156/332

(58) Field of Classification Search .................. 428/463; 156/332
See application file for complete search history.

(56) References Cited

U.S. PATENT DOCUMENTS

| | | | |
|---|---|---|---|
| 4,145,477 A | 3/1979 | Smiley | |
| 2005/0209358 A1* | 9/2005 | Miller | ........................... 522/113 |
| 2005/0217789 A1* | 10/2005 | Eckstein et al. | ......... 156/244.11 |
| 2008/0224105 A1 | 9/2008 | Green et al. | |

FOREIGN PATENT DOCUMENTS

| | | |
|---|---|---|
| JP | 2 151669 | 6/1990 |
| WO | 2005 000975 | 1/2005 |
| WO | 2005 087875 | 9/2005 |

OTHER PUBLICATIONS

U.S. Appl. No. 12/669,573, filed Jan. 19, 2010, Schmitt, et al.

* cited by examiner

*Primary Examiner* — Peter D Mulcahy
(74) *Attorney, Agent, or Firm* — Oblon, Spivak, McClelland, Maier & Neustadt, L.L.P.

(57) ABSTRACT

The invention relates to a coating formulation with improved metal adhesion.

14 Claims, No Drawings

COATING FORMULATION WITH ENHANCED METAL ADHESION

The invention relates to a coating formulation with improved metal adhesion.

Architectural paints and varnishes prevent rapid dilapidation and maintain the functioning of buildings. For every building material, every substrate and every kind of subsequent exposure, the manufacturers of building paints offer optimized and tailored coating materials, usually combined into systems.

Steel is a building material which is of high value and can be used almost universally. Moreover, certain build structures would be impossible without it. Wide-span bridges, masts and chemical plants are erected from unalloyed or low-alloy steel. Steel of this class has a problematic quality: when atmospheric oxygen and moisture are present simultaneously, it corrodes. In corrosion, the high-energy iron metal obtained by the smelting process undergoes conversion back into its natural and low-energy oxide form, rust. The steel component gradually loses material. This jeopardizes stability or load-bearing capacity.

Corrosion control systems are composed of a plurality of component coatings which are tailored to one another and which together form a barrier against oxygen and moisture. The basecoat, whose binders consist primarily of alkyd resins or epoxy resins, is followed by the intermediate coat, for improving the barrier function. The topcoat ensures weather resistance on the one hand and optical quality on the other, in other words colour and gloss. Alkyd resins and high-grade polyurethane binders based on acrylic resins and aliphatic polyisocyanate curing agents are nowadays the most important binders.

One problem associated with the coating of building materials is the adhesion of the corrosion control systems to the different materials. Corrosion can only be inhibited by a full-area material bond between building material and coating. Moreover, control systems become brittle as a result of environmental influences, and then fall off under the slightest mechanical stress. Consequently there are usually small defects in the coating, in which, very quickly, the corrosive degradation of the underlying material commences. In the case of objects whose stability and/or load-bearing power are critically important, therefore, it is necessary to establish a monitoring process, which is labour-intensive and costly. Bridge constructions, for example, must be examined with regular control visits for any corrosion damage there might be.

Often the coating is applied on-site during the construction phase. Preferred, however, are in-shop applications, since these can take place under controlled conditions. In the case of slow drying, however, the cycle time becomes impractical, because the components cannot be moved until drying is complete.

One object was to provide an improved coating formulation which exhibits good adhesion properties, more particularly to metal surfaces.

A further object was to provide a process for producing it.

The object has been achieved by coating formulations for metals, comprising a resin system with at least one ethylenically unsaturated monomer component, characterized in that there are at least one polymeric component with an acid (meth)acrylate or copolymerizable, multiply functionalized carboxylic acids selected from the group of the dicarboxylic acids.

Surprisingly it has been found that the new coating formulation has outstanding adhesion properties to metallic surfaces, more particularly to steel.

The coatings of the invention can be used both on-site and in-shop.

It has been found that the coating formulations dry very quickly. Drying times of approximately 1 hour are achieved. Through the further addition of curing agents it is possible to lower the drying/curing time further. Accordingly the preferred in-shop application can take place within acceptable cycle times.

It has been found, moreover, that the quick-drying/curing and well-adhering coating formulations are also outstandingly suitable for thick coating films, for example 1-5 mm.

Crosslinkers used are, more particularly, polyfunctional methacrylates such as allyl methacrylate, ethylene glycol dimethacrylate, diethylene glycol dimethacrylate, triethylene glycol dimethacrylate, tetraethylene glycol dimethacrylate, polyethylene glycol dimethacrylate, 1,3-butanediol dimethacrylate, 1,4-butanediol dimethacrylate, 1,6-hexanediol dimethacrylate, 1,12-dodecanediol dimethacrylate, glycerol dimethacrylate and trimethylolpropane trimethacrylate.

Resin systems for the coating of metal surfaces are known.

The coating resin preferably comprises at least one thermoplastic polymer resin in combination with low molecular mass monomers or oligomers having ethylenically unsaturated double bonds, in the form for example of alpha-beta ethylenically unsaturated carboxylate ester groups such as methacrylate or acrylate groups, for example.

The notation (meth)acrylate here denotes not only methacrylate, such as methyl methacrylate, ethyl methacrylate, etc., for example, but also acrylate, such as methyl acrylate, ethyl acrylate, etc., for example, and also mixtures of both.

One thermoplastic polymer is preferably a (meth)acrylate resin, in the form of homopolymer, copolymer and/or terpolymer. With particular preference one polymer component can be a (meth)acrylate polymer. This polymer can be prepared via the polymerization of one or more methacrylate or acrylate monomers, preferably from the group of methyl (meth)acrylates, ethyl (meth)acrylate, n-butyl (meth)acrylate, isobutyl (meth)acrylate, tert-butyl (meth)acrylate, 2-hydroxyethyl (meth)acrylate, 2-hydroxypropyl (meth)acrylate and/or 2-ethylhexyl (meth)acrylate. Co-reagents may be styrene or vinyltoluenes. One particularly preferred thermoplastic polymer is a copolymer of butyl methacrylate and methyl methacrylate.

One ethylenically unsaturated monomer component comprises at least one methacrylate or acrylate functionality.

One ethylenically unsaturated monomer component can preferably be selected from the group of methyl (meth)acrylate, ethyl (meth)acrylate, n-butyl (meth)acrylate, isobutyl (meth)acrylate, tert-butyl (meth)acrylate, 2-hydroxyethyl (meth)acrylate, 2-hydroxypropyl (meth)acrylate and/or 2-ethylhexyl (meth)acrylate.

Another class of thermoplastic polymer resins comprises homopolymers, copolymers or terpolymers of vinyl monomers such as styrene, vinyltoluene, vinyl chloride, vinyl acetate, vinylidene chloride and/or vinyl ester, for example. Co-reagents may be dienes, such as butadiene, for example.

The thermoplastic resins form 10%-60% by weight of the resin component of the coating mixture.

The polymeric component can comprise methyl (meth)acrylate, ethyl (meth)acrylate, n-butyl (meth)acrylate, isobutyl (meth)acrylate, tert-butyl (meth)acrylate, 2-hydroxyethyl (meth)acrylate, 2-hydroxypropyl (meth)acrylate and/or 2-ethylhexyl (meth)acrylate.

One polymeric component can also be a reaction product of one or more dienes with at least one styrene, vinyltoluene, vinyl chloride, vinyl acetate, vinylidene chloride and/or vinyl ester.

At least one of the liquid monomer components comprises methacrylate functionalities, with particular preference methacrylic esters. If desired it is also possible for an acrylate functionality to be present, preferably acrylic esters.

Moreover, one monomer component is monofunctional, so that the reaction product with an organic peroxide is thermoplastic and melts and flows up to the reaction temperature of the additives.

By way of example one ethylenically unsaturated monomer component is selected from the group of methyl (meth)acrylates, ethyl (meth)acrylates, n-butyl (meth)acrylates, isobutyl (meth)acrylates, tert-butyl (meth)acrylates, 2-hydroxyethyl (meth)acrylate, 2-hydroxypropyl (meth)acrylate and/or 2-ethylhexyl (meth)acrylates and mixtures thereof. Methyl methacrylate and 2-ethylhexyl acrylate are particularly preferred.

The liquid monomer component forms 30%-60% by weight of the resin component of the coating mixture.

The resin component forms 10%-60% by weight, with particular preference 25%-50% by weight, of the coating mixture.

Initiators are used in order to cure the liquid coating formulation. Use is made of AZO initiators or organic peroxides. Preferred initiators used are dialkyl peroxides, keto peroxides, peroxy esters, diacyl peroxides, hydroperoxides and/or peroxy ketals. The initiator is used in amounts of 0.5% to 5%, with particular preference 1%-4% with respect to the overall resin composition.

When using dibenzoyl peroxide as initiator it is preferred to add a tertiary amine in order to accelerate curing. Preferred tertiary amines are N,N-dimethylanilines and N,N-dialkyl-p-toluidines.

The fraction of the tertiary amines as a proportion of the overall resin mixture is 0.1%-4%, preferably 0.25%-3%.

Preferred azo initiators are 2,2-azobis(amidinopropane) dihydrochloride, 2,2-azobis(2-methylbutyronitrile), 2,2-azobis(2-methylpropanenitrile), 2,2-azobis(2,4-dimethylpentanenitrile), and mixtures thereof.

A substantial improvement in the adhesion properties of the coating on metal surfaces is achieved through the addition of acid (meth)acrylates or polymerizable, multiply functionalized carboxylic acids. The acid (meth)acrylates are preferably selected from the group of the dicarboxylic acids, particular preference being given to β-CEA. The copolymerizable, multiply functionalized carboxylic acids are selected with particular preference from the group of the itaconic acids, fumaric acids and maleic acids.

Beta-CEA is the Michael addition product of acrylic acid and is always a mixture of:

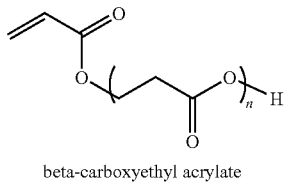

beta-carboxyethyl acrylate where n=1-20

The acid (meth)acrylates and, respectively, copolymerizable, multiply functionalized carboxylic acids are preferably part of the polymeric component of the resin.

These acid (meth)acrylates additionally have a good dispersing effect on the colour constituents used.

The object has also been achieved by a process for producing coating formulations. The process of the invention is characterized in that at least one ethylenically unsaturated monomer component and at least one polymeric component with an acid (meth)acrylate from the group of the dicarboxylic acids or copolymerizable, multiply functionalized carboxylic acids and the customary auxiliaries and additives are polymerized by means of free radical polymerization.

Thixotropic adjuvants can be used in order to improve the rheology, in order to make thick coatings possible in one application step. They are added in amounts of 0%-2%, preferably 0.05%-1%, based on the total amount of the coating.

It is also possible for wetting adjuvants or dispersion adjuvants to be added.

Prior to the application of the coating to the metallic surface the organic peroxide is added. This initiates the free-radical reaction in the course of which the liquid coating cures. Typically the cure time is 30 minutes. It can be varied through the amount of initiator and accelerator.

The coating formulation can be applied by means of spraying technology, brush, roller, spatula or dipping process. As an alternative it is also possible to use a multi-component spraying system.

The metal surface is typically cleaned before the coating is applied, in order to remove processing residues and the like. In some cases primers are applied as well.

It is also possible to apply a topcoat, for exposed metal surfaces, for example.

The invention claimed is:

1. A coated steel structure, comprising:
a steel surface; and directly adhered to the steel surface;
a coating layer obtained by applying to the surface, a coating composition; and then curing the composition; wherein the coating composition comprises:
a resin component comprising a thermoplastic resin;
a liquid monomer component comprising a methacrylate or acrylate monomer; and
an organic peroxide initiator or an azo initiator;
wherein
the thermoplastic resin comprises as polymerized units:
at least one monofunctional monomer selected from the group consisting of methyl (meth)acrylate, ethyl (meth)acrylate, n-butyl (meth)acrylate, isobutyl (meth)acrylate, tert-butyl (meth)acrylate, 2-hydroxyethyl (meth)acrylate, 2-hydroxypropyl (meth)acrylate and 2-ethylhexyl (meth)acrylate and
at least one acid monomer selected from the group consisting of an acid (meth)acrylate and a beta-carboxyethyl acrylate of formula:

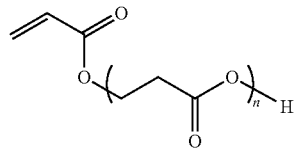

wherein n=1-20, and/or
a polymerizable dicarboxylic acid.

2. The coated steel structure according to claim 1, wherein the thermoplastic resin is at least one selected from the group consisting of copolymers and terpolymers of a methacrylate monomer.

3. The coated steel structure according to claim 2, wherein the thermoplastic resin comprises a (meth)acrylate copolymer.

4. The coated steel structure according to claim 1, wherein the thermoplastic resin comprises at least one of a copolymer or terpolymer obtained by polymerizing monomers comprising at least one monomer selected from the group consisting of methyl (meth)acrylate, ethyl (meth)-acrylate, n-butyl (meth)acrylate, isobutyl (meth)acrylate, tert-butyl (meth) acrylate, 2-hydroxyethyl (meth)acrylate, 2-hydroxypropyl (meth)acrylate and 2-ethylhexyl (meth)acrylate.

5. The coated steel structure according to claim 1, wherein the thermoplastic resin further comprises a reaction product of one or more dienes with at least one selected from the group consisting of styrene, vinyltoluene, vinyl chloride, vinyl acetate, vinylidene chloride and a vinyl ester.

6. The coated steel structure according to claim 1, wherein the methacrylate or acrylate monomer component is at least one selected from the group consisting of methyl (meth) acrylate, ethyl (meth)acrylate, n-butyl (meth)acrylate, isobutyl (meth)acrylate, tert-butyl (meth)acrylate, 2-hydroxyethyl (meth)acrylate, 2-hydroxypropyl (meth)acrylate and 2-ethylhexyl (meth)acrylate.

7. A process for producing the coated steel structure, according to claim 1, the process comprising:
applying a composition to the steel structure; and
free radical polymerization of the applied composition;
wherein the composition comprises:
a resin component comprising a thermoplastic resin;
a liquid monomer component comprising a methacrylate or acrylate monomer; and
an organic peroxide initiator or an azo initiator;
wherein
the thermoplastic resin comprises as polymerized units:
at least one monofunctional monomer selected from the group consisting of methyl (meth)acrylate, ethyl (meth) acrylate, n-butyl (meth)acrylate, isobutyl (meth)acrylate, tert-butyl (meth)acrylate, 2-hydroxyethyl (meth) acrylate, 2-hydroxypropyl (meth)acrylate and 2-ethylhexyl (meth)acrylate and
at least one acid monomer selected from the group consisting of an acid (meth)acrylate and a beta-carboxyethyl acrylate of formula:

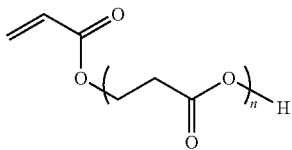

wherein n=1-20, and/or
a polymerizable dicarboxylic acid.

8. The process for producing the coated steel structure according to claim 7, wherein the initiator is an organic peroxide.

9. The process for producing the coated steel structure according to claim 8, wherein the organic peroxide is selected from the group consisting of dialkyl peroxides, keto peroxides, peroxy esters, diacyl peroxides, hydroperoxides and peroxy ketals.

10. A method to coat a metal surface, comprising:
applying a coating composition to the metal surface; and
free radically polymerizing the applied coating composition on the metal surface;
wherein the thermoplastic resin comprises as polymerized units:
at least one monofunctional monomer selected from the group consisting of methyl (meth)acrylate, ethyl (meth) acrylate, n-butyl (meth)acrylate, isobutyl (meth)acrylate, tert-butyl (meth)acrylate, 2-hydroxyethyl (meth) acrylate, 2-hydroxypropyl (meth)acrylate and 2-ethylhexyl (meth)acrylate and
at least one acid monomer selected from the group consisting of an acid (meth)acrylate and a beta-carboxyethyl acrylate of formula:

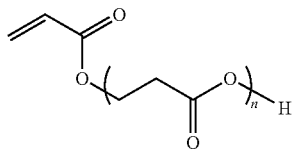

wherein n=1-20, and/or
a polymerizable dicarboxylic acid.

11. The coated steel structure according to claim 1, wherein the coating composition comprises an organic peroxide initiator, and the organic peroxide initiator is dibenzoyl peroxide, and the composition further comprises a tertiary amine.

12. The coated steel structure according to claim 11, wherein the tertiary amine is N,N-dimethylaniline or an N,N-dialkyl-p-toluidine.

13. The coated steel structure according to claim 11, wherein a weight % of the tertiary amine in the coating composition is from 0.1 to 4%.

14. The process according to claim 7, wherein the coating composition comprises an organic peroxide initiator, and the organic peroxide initiator is dibenzoyl peroxide, and the composition further comprises a tertiary amine.

* * * * *